(12) United States Patent
Kim et al.

(10) Patent No.: US 11,373,340 B2
(45) Date of Patent: Jun. 28, 2022

(54) DISPLAY APPARATUS AND CONTROLLING METHOD THEREOF

(71) Applicant: SAMSUNG ELECTRONICS CO., LTD., Suwon-si (KR)

(72) Inventors: Dowan Kim, Suwon-si (KR); Haekyung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/688,370

(22) Filed: Nov. 19, 2019

(65) Prior Publication Data
US 2020/0167970 A1 May 28, 2020

(30) Foreign Application Priority Data
Nov. 23, 2018 (KR) .......................... 10-2018-0146675

(51) Int. Cl.
*G06T 11/00* (2006.01)
*G06K 9/62* (2022.01)
*G06V 20/20* (2022.01)

(52) U.S. Cl.
CPC ............ *G06T 11/00* (2013.01); *G06K 9/6215* (2013.01); *G06V 20/20* (2022.01)

(58) Field of Classification Search
CPC ............. G06K 9/00671; G06K 9/6215; G06T 2207/20221; G06T 19/006; G06T 11/60; G01B 2210/52
USPC .................................................. 345/629–633
See application file for complete search history.

(56) References Cited

U.S. PATENT DOCUMENTS

| 6,522,787 | B1 * | 2/2003 | Kumar | G06T 15/10 348/E5.022 |
| 7,119,819 | B1 * | 10/2006 | Robertson | G06F 3/04815 715/782 |
| 7,589,747 | B2 * | 9/2009 | Matsui | G06T 7/30 345/633 |
| 8,732,599 | B2 * | 5/2014 | Reghetti | G06T 19/20 715/765 |
| 9,047,698 | B2 | 6/2015 | Maciocci et al. | |

(Continued)

FOREIGN PATENT DOCUMENTS

| KR | 10-2012-0086795 A | 8/2012 |
| KR | 10-1720132 B1 | 3/2017 |
| KR | 10-2018-0062328 A | 6/2018 |

*Primary Examiner* — Ryan R Yang
(74) *Attorney, Agent, or Firm* — Sughrue Mion, PLLC

(57) ABSTRACT

A display apparatus providing an augmented reality (AR) object and a controlling method thereof are provided. The display apparatus includes a display, a communication interface, a camera, and a processor configured to control the display to display a first image captured in real time by the camera, and based on first information about a first space included in a second image captured in real time by an external apparatus and location information of a first AR object provided in the first space of the second image being received, control the display to add a second AR object corresponding to the first AR object to the first image and display the second AR object based on second information about a second space included in the first image, the first information about the first space included in the second image, and location information of the first AR object provided in the first space.

16 Claims, 10 Drawing Sheets

(56) References Cited

U.S. PATENT DOCUMENTS

| | | | |
|---|---|---|---|
| 10,031,927 B2* | 7/2018 | Petrou | G06F 16/24578 |
| 2005/0001852 A1* | 1/2005 | Dengler | H04N 5/2723 |
| | | | 345/633 |
| 2008/0100620 A1* | 5/2008 | Nagai | A63F 3/00643 |
| | | | 345/424 |
| 2012/0195464 A1 | 8/2012 | Ahn | |
| 2013/0188886 A1* | 7/2013 | Petrou | G06K 9/228 |
| | | | 382/305 |
| 2014/0218397 A1* | 8/2014 | Rutman | G06T 3/4092 |
| | | | 345/632 |
| 2014/0354534 A1* | 12/2014 | Mullins | G06F 3/013 |
| | | | 345/156 |
| 2015/0193982 A1* | 7/2015 | Mihelich | H04L 67/18 |
| | | | 345/633 |
| 2018/0185757 A1 | 7/2018 | Miller et al. | |
| 2018/0341811 A1* | 11/2018 | Bendale | G06K 9/3233 |
| 2019/0094981 A1* | 3/2019 | Bradski | G02B 27/0093 |
| 2019/0163344 A1* | 5/2019 | Tsurumi | G06T 19/006 |
| 2019/0293609 A1* | 9/2019 | Oh | G01S 15/86 |
| 2019/0303730 A1* | 10/2019 | Ishii | G06K 9/6215 |
| 2019/0304198 A1* | 10/2019 | Costa | G06F 3/0304 |
| 2020/0167567 A1* | 5/2020 | Heo | G06F 30/12 |

* cited by examiner

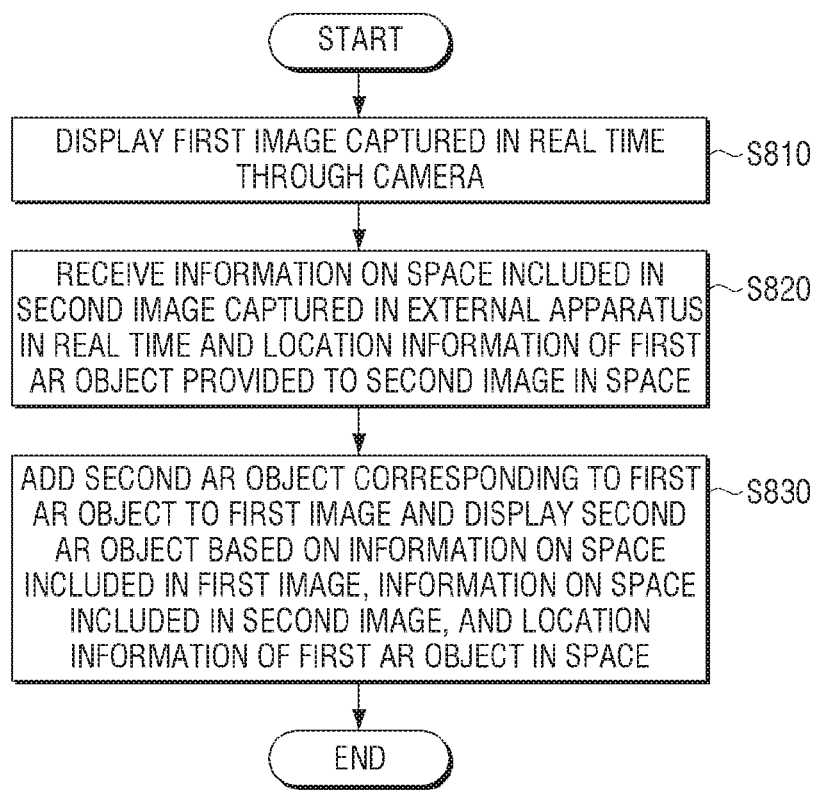

DISPLAY APPARATUS AND CONTROLLING METHOD THEREOF

CROSS-REFERENCE TO RELATED APPLICATION(S)

This application is based on and claims priority under 35 U.S.C. § 119 to Korean Patent Application No. 10-2018-0146675, filed on Nov. 23, 2018, in the Korean Intellectual Property Office, the disclosure of which is herein incorporated by reference in its entirety.

BACKGROUND

1. Field

The disclosure relates to a display apparatus and a controlling method thereof, and more specifically, to a display apparatus providing an augmented reality (AR) object and a controlling method thereof.

2. Description of Related Art

With the development of electronic technology, various types of electronic apparatuses are being developed and provided.

Especially, as portable apparatuses having a capturing function, such as a smart phone, a tablet personal computer (PC), etc., are developed and provided, the research and development and use of the AR function has been increased.

AR may be a technology that adds a virtual object to a real object (e.g., an actual environment and a real object) and provides the combined object.

There have been various attempts to share the content to which the AR technology is integrated, with another user in real time. However, in the existing AR technology, when a user shares an AR image (or, an AR screen) with another user, an object, environment, etc. in the reality are not the same and thus, there has been a problem that the virtual object in the AR image provided to a user and the virtual object in the AR image provided to the other user are located in different positions.

Accordingly, when sharing the AR image between a user and another user located in different spaces and environments, the virtual object should be located in an appropriate location.

SUMMARY

In accordance with an aspect of the disclosure, there is provided a display apparatus including: a display; a communication interface; a camera; and a processor configured to: control the display to display a first image captured in real time by the camera, and based on first information about a first space included in a second image captured in real time by an external apparatus and location information of a first augmented reality (AR) object provided in the first space of the second image being received, control the display to display a second AR object by adding the second AR object corresponding to the first AR object to the first image based on second information about a second space included in the first image, the first information about the first space included in the second image, and the location information of the first AR object provided in the first space.

The processor may be configured to identify an area where the second AR object is to be displayed based on the second information about the second space included in the first image and the first information about the first space included in the second image, and control the display to display the second AR object at a specific location of the identified area based on the location information of the first AR object provided in the first space.

The location information of the first AR object provided in the first space may include relative location information of the first AR object provided in a specific space included in the second image, and the processor may be further configured to identify location information corresponding to the relative location information of the first AR object provided in a specific space included in the first image and control the display to display the second AR object at the specific location.

The processor may be configured to, based on another object being located at a location of the identified location information, re-identify location information of the second AR object provided in a specific space included in the first image based on the second information about the second space included in the first image.

The second information about the second space included in the first image and the first information about the first space included in the second image may include at least one of color information, material information, type information or size information regarding an object included in each of the first space and the second space, and the processor may be configured to identify an area where the second AR object is to be displayed based on a similarity value regarding at least one of color information, material information, type information or size information of an object included in each of the first space and the second space.

The processor may be configured to, based on object identification information and additional information corresponding to the object identification information being received, identify an object corresponding to the object identification information in the first image, and control the display to display an AR object corresponding to the additional information at an area where the identified object is displayed.

The processor may be configured to identify a spatial characteristic of the area where the identified object is displayed and control the display to display an AR object corresponding to the spatial characteristic.

The processor may be configured to obtain the second information about the second space included in the first image and the first information about the second space included in the second image using at least one of a point cloud or a semantic segmentation.

In accordance with an aspect of the disclosure, there is provided a display including a display apparatus including: a display; a communication interface; a camera; and a processor configured to: control the display to display an image captured in real time by the camera, obtain information about a space included in the image and location information of an AR object provided in the space of the image, and control the communication interface to transmit the obtained information to an external apparatus; wherein the location information of the AR object provided in the space includes relative location information of the AR object provided in a specific space included in the image.

In accordance with an aspect of the disclosure, there is provided a method for controlling a display apparatus, the method including: displaying a first image captured in real time by a camera; receiving first information about a first space included in a second image captured in real time by an external apparatus and location information of a first AR object provided in the first space of the second image; and displaying a second AR object by adding the second AR object corresponding to the first AR object to the first image based on second information about a second space included in the first image, the first information about the first space included in the second image, and the location information of the first AR object provided in the first space.

The displaying the second AR object may include: identifying an area where the second AR object is to be displayed based on the second information about the second space included in the first image and the first information about the first space included in the second image; displaying the second AR object at a specific location of the identified area based on the location information of the first AR object provided in the first space; and adding an obtained object image to a corresponding image section of the first image and displaying the object image, based on the location information of the first AR object provided in the first space.

The location information of the first AR object provided in the first space may include relative location information of the first AR object provided in a specific space included in the second image, and the displaying the second AR object may include identifying location information corresponding to relative location information on the first AR object provided in a specific space included in the first image and displaying the second AR object at the specific location.

The displaying the second AR object may include, based on another object being located at a location of the identified location information, re-identifying location information of the second AR object provided in a specific space included in the first image based on the second information about the second space included in the first image.

The second information about the second space included in the first image and the first information about the first space included in the second image may include at least one of color information, material information, type information or size information regarding an object included in each of the first space and the second space, and the displaying the second AR object may include identifying an area where the second AR object is to be displayed based on a similarity value regarding at least one of color information, material information, type information or size information regarding an object included in each of the first space and the second space.

The receiving may include receiving object identification information and additional information corresponding to the object identification information, and the displaying the second AR object may include: identifying an object corresponding to the object identification information in the first image, and displaying an AR object corresponding to the additional information at an area where the identified object is displayed.

The displaying the AR object corresponding to the additional information may include identifying a spatial characteristic of the area where the identified object is displayed and displaying an AR object corresponding to the spatial characteristic.

The displaying the second AR object may include obtaining the second information about the second space included in the first image and the first information about the first space included in the second image using at least one of a point cloud or a semantic segmentation.

In accordance with an aspect of the disclosure, there is provided a method for controlling a display apparatus including displaying an image captured in real time through the camera, obtaining information on a space included in the image and location information of an AR object in the space provided to the image, and transmitting the obtained information to an external apparatus, and the location information of an AR object in the space may include relative location information of the AR object in a specific space included in the image.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a flow chart illustrating a method for controlling a display apparatus according to an embodiment.

DETAILED DESCRIPTION

Hereinafter, the disclosure will be described in detail with reference to the accompanying drawings.

Terms used in the disclosure are selected as general terminologies currently widely used in consideration of the configuration and functions of the disclosure, but can be different depending on the intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

In the description, the terms "has," "may have," "includes" or "may include" indicates existence of a corresponding feature (e.g., a numerical value, a function, an operation, or a constituent element such as a component), but does not exclude existence of an additional feature.

The term "at least one of A or B" may designate one of only "A," only "B" or both "A and B."

The expressions "1," "2," "first," or "second" as used herein may use a variety of elements, irrespective of order and/or importance thereof, and only to distinguish one element from another without limiting the corresponding elements.

If it is described that a certain element (e.g., first element) is "(operatively or communicatively) coupled with/to" or is "connected to" another element (e.g., second element), it should be understood that the certain element may be connected to the other element directly or through still another element (e.g., third element).

The singular expression also includes the plural meaning as long as it does not differently mean in the context. The terms "include," "comprise," "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in specific hardware.

In the disclosure, the term "user" may refer to a person who uses an electronic apparatus or an apparatus (e.g., an artificial intelligence (AI) electronic apparatus) that uses the electronic apparatus.

Embodiments of the disclosure are described in greater detail below with reference to the accompanying drawings.

Figure 1:
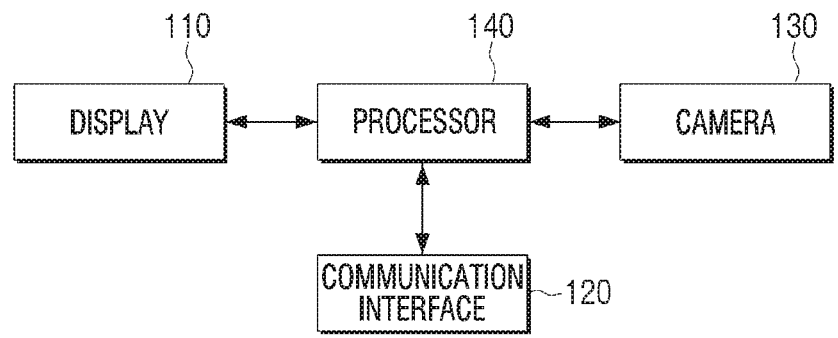
FIG. 1 is a view illustrating a configuration of a display apparatus according to an embodiment.

FIG. 1 is a view illustrating a configuration of a display apparatus according to an embodiment.

A display apparatus 100 may be implemented as an apparatus including a display function such as a television (TV), a smartphone, a tablet PC, a personal music player (PMP), a Personal Digital Assistant (PDA), a notebook PC, a smart watch, a head mounted display (HMD), a near eye display (NED), etc. The display apparatus 100 may include various forms of display for providing a display function.

However, various embodiments according to the disclosure may be implemented through an electronic apparatus which does not include a display function. For example, various types of electronic apparatuses which provides an image to an external apparatus such as a Blu-ray player, a digital versatile disc (DVD) player, a streaming contents output apparatus, a set top box, etc. may implement various embodiments of the disclosure. As another example, various types of home appliances such as a speaker, a refrigerator, an air conditioner, an air cleaner, various types of Internet of things, etc. may implement various embodiments of the disclosure. Hereinafter an embodiment will be described by assuming that the display apparatus 100 is a user terminal apparatus including a camera 130 for convenience of description.

Referring to FIG. 1, the display apparatus 100 includes a display 110, a communication interface 120, a camera 130 and a processor 140.

The display 110 may provide various content screens that can be provided through the display apparatus 100. Here, the content screen may include various contents such as an image, a moving image, a text, music, etc., an application execution screen, graphic user interface (GUI) screen, etc.

The display 110 may be implemented as various types of displays, such as a liquid crystal display (LCD), an organic light emitting diodes (OLED) display, a plasma display panel (PDP), and the like. The display 110 may include a driving circuit, a backlight unit, and the like which may be implemented in forms such as an a-si TFT, a low temperature poly silicon (LTPS) TFT, an organic TFT (OTFT), and the like. The display 110 may be implemented as a touch screen combined with a touch sensor, a flexible display, a 3-dimensional (3D) display, etc.

The display 110 according to an embodiment may include a bezel which performs housing of a display panel, in addition to a display panel outputting an image. Especially, the bezel according to the embodiment may include a touch sensor for detecting a user interaction.

Especially, the display 110 may display an image (e.g., a live view image) captured in real time through the camera 130 according to a control of the processor 140, an AR image generated by adding a virtual AR object to the corresponding image, etc.

The communication interface 120 is a configuration for performing communication with an external apparatus.

The communication interface 120 according to an embodiment may receive information on a space included in the image captured in real time in an external apparatus, and location information of an AR object provided in the image in the space. For example, it may be assumed that the external apparatus operates in an AR mode and displays an AR image generated by adding an AR object to the image captured in real time using the camera included in an external apparatus. In this case, the communication interface 120 may communicate with an external apparatus according to a control of the processor 140 and receive information on the AR image being displayed in the external apparatus. The detailed description thereof will be made with reference to FIG. 3A and FIG. 3B. Hereinafter, the image provided through the display 110 will be referred to as the first image and the image provided through the display included in an external apparatus will be referred to as the second image for convenience of description.

The display apparatus 100 according to an embodiment may include at least one camera 130 at a front or a rear side thereof.

The camera 130 is an apparatus which captures a still image and a video, and may include at least one image sensor (e.g. a front sensor or a rear sensor), a lens, an image signal processor (ISP), or a flash (e.g. LED, xenon lamp, etc.).

The camera 130 according to an embodiment may capture an arbitrary subject according to the control of the processor 140 and transmit the captured data to the processor 140. The captured data may be stored in a storage according to the control of the processor 140. Here, the captured data may be referred to by various names such as a picture, an image, a still image, a moving image, etc., but hereinafter the captured data will be referred to as an image captured in real time for convenience of description. The image according to various embodiments may refer to an image received from an external apparatus or an external server, an image stored in a storage, etc., in addition to the live view image captured through the camera 130.

According to an embodiment, the processor 140 may display the AR screen generated by adding an AR object to an image captured through the camera 130, through the display 110.

The processor 140 may be implemented as a digital signal processor (DSP), a microprocessor, or a Time controller (TCON). However, it is not limited thereto and the processor 140 may include one or more than one of a central processing unit (CPU), a micro controller unit (MCU), a micro processing unit (MPU), a controller, an application processor (AP), a communication processor (CP) or an ARM processor, or defined as the corresponding terms. In addition, the processor 140 may be implemented as a System on Chip (SoC) or a large scale integration (LSI) in which a processing algorithm is embedded, or implemented in a form of a Field Programmable gate array (FPGA). The processor 140 may perform various functions by executing computer executable instructions stored in the memory 120.

The processor 140 according to an embodiment may receive information on a space included in the second image captured in real time in an external apparatus and information of an AR object included in the second image, by communicating with an external apparatus through the communication interface 120. In addition, the processor 140 may add the AR object to the first image based on the information on a space included in the first image captured in real time through the camera 130, the information on the space included in the second image and the information on the AR object included in the second image. The processor 140 may provide an AR screen generated by adding an AR object to the first image through the display 110. Hereinafter the AR object included in the AR screen provided by an external apparatus will be called the first AR object and the AR object added to the first screen provided through the display 110 will be called the second object for convenience of description. The detailed description thereof will be made with reference to FIGS. 3A and 3B.

Figure 3A:
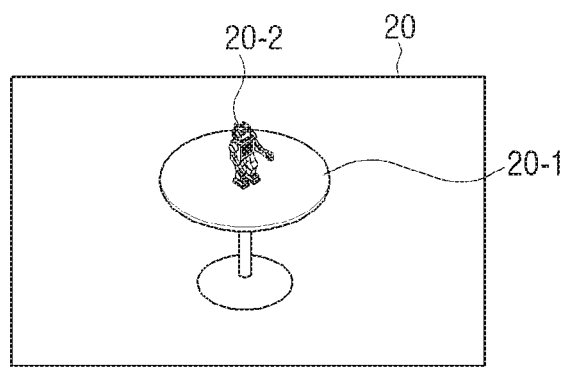
FIG. 3A and FIG. 3B are views for illustrating an AR object according to an embodiment.
Figure 3B:
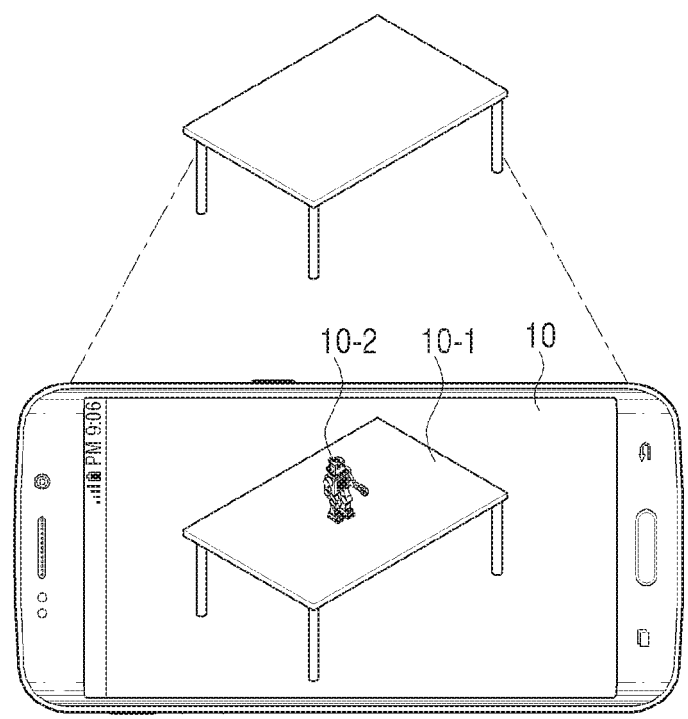

FIGS. 3A and 3B are views for illustrating an AR object according to an embodiment.

FIG. 3A is a view illustrating that an external apparatus displays the second image (e.g., an AR screen 20) through a display.

The external apparatus may capture a real object (e.g., furniture, home appliances, wall, background, etc.) and provide the second image 20 captured in real time through the display. Here, the real object may mean a subject. According to an embodiment, the information 20-1 on a space included in the second image 20 displayed in an external apparatus and location information of the first AR object 20-2 provided in the second image 20 in the space may be transmitted to the display apparatus 100. For convenience of description, the embodiment in which an external apparatus transmits information to the display apparatus 100 has been described, but in the other way, the display apparatus 100 may transmit information to an external apparatus, needless to say. For example, the processor 110 may transmit the information on the space included in the first image captured in real time through the camera 130 and the location information of the AR object provided to the first image in the space through the communication interface 120 to an external apparatus.

FIG. 3B illustrates that the display apparatus 100 adds the second AR object 10-2 to the first image 10 captured in real time through the camera 130 and provides the image through the display 110.

The processor 140 according to an embodiment may add the second AR object 10-2 to the first image 10 based on information 10-1 on the space included in the first image 10, the information 20-1 on the space included in the second image 20 received from an external apparatus, and the location information of the first AR object 20-2 provided to the second image 20 in the space.

Here, the information 10-1 on the space included in the first image 10 may include at least one of color information, material information, type information or size information on the object included in the space.

The processor 140 according to an embodiment may identify the object included in the space regarding the first image 10. For example, the processor 140 may obtain a representative image regarding a specific object from database in which information regarding the object is matched and stored, and identify the object by comparing the first image 10 and the characteristic of the object according to the obtained representative object based on a predetermined algorithm. Here, the processor 140 may apply various object characteristic extraction algorithms; for example, Scale Invariant Feature Transform (SIFT), Histogram of Oriented Gradient (HOG), Haar-like Feature, Ferns, Local Binary Pattern (LBP), Modified Census Transform (MCT), etc. may be applied.

Also, the processor 140 may obtain at least one of color information, material information, type information or size information on the identified object as the information 10-1 on the space included in the first image 10.

The processor 140 may obtain color information regarding the object by identifying the color corresponding to the object identified in the first image 10. The processor 140 may obtain the material information of the object based on the pattern of the surface of the object identified in the first image 10.

The type information of the object according to an embodiment may indicate whether the corresponding object is a flat surface. In addition, if the corresponding object is a flat space, the type information may include the size information of the flat space.

Referring to FIG. 3B, the processor 140 according to an embodiment may estimate whether the object included in the first image 10 is a flat space. For example, a plurality of points composing the flat space may be adjacent to each other according to Spatial Coherency. The processor 140 may estimate the flat space in the first image 10 using arbitrary points adjacent to each other. The processor 140 may identify whether the arbitrary points adjacent to each other exist in the same flat space, and obtain the flat space and the size information of the corresponding flat space based on the identification result.

For example, the processor 140 may identify whether a specific object is a flat space in the image (or whether includes a flat surface) using the first to third points adjacent to each other (or spaced apart from each other within a threshold value). If the specific object is a flat surface according to the identification result, the processor 140 may obtain A, B, C, and D which are the coefficient of a flat surface equation based on the first to third points. The processor 140 may obtain the flat surface equation as information 10-1 on the surface based on Equation 1 below.

$$Ax+By\pm Cz+D=0 \quad\quad\quad\quad \text{[Equation 1]}$$

Here, the A, B, and C may be normal vectors indicating the direction of the flat surface, and D may be the distance between the flat surface including the first to third points and the camera 130.

Referring to FIG. 3A, the information 20-1 on the space included in the second image 20 received from an external apparatus may include at least one of color information, material information, type information or size information on the object included in the space. The description regarding each information overlaps with the information 10-1 on the space included in the first image 10, and thus, will be omitted.

The processor 140 according to an embodiment may identify the area in which the second AR object is to be displayed based on the information on the space included in the first image and the information on the space included in the second image. Here, the second AR object may refer to an AR object which is similar to or the same with the first AR object. For example, referring to FIG. 3A, the first AR object 20-2 displayed in the external apparatus is an image corresponding to the view direction of the camera included in the external apparatus in the 3D object. Referring to FIG. 3B, the second AR object 10-2 displayed in the display apparatus 100 is an image corresponding to the view direction of the camera 130 in the same 3D object. If the view direction of the external apparatus is the same as that of the display apparatus 100, the first AR object 20-2 and the second AR object 10-2 may be in the same shape, but if the view direction of the external apparatus is different from that of the display apparatus 100, the shape of the first AR object 20-2 may be different from that of the second AR object 10-2 even if the first AR object 20-2 and the second AR object 10-2 are the images regarding the same 3D object.

The processor 140 according to an embodiment may identify the area in which the second AR object 10-2 is to be displayed based on the similarity value regarding at least one of color information, material information, type information or size information on the object included in each space based on the information 10-1 on the space included in the first image 10 and the information 20-1 on the space included in the second image 20.

If at least one of color information, material information, type information or size information on the object included in the second image 20 is received from an external apparatus, the processor 140 may obtain the information corresponding to the received information among the color information, material information, type information or size information on the object included in the first image 10. In addition, the processor 140 may calculate the similarity value between the information received from the external apparatus and the obtained information.

In addition, the processor 140 may identify whether the similarity value is the same or greater than the threshold value. According to the identification result, if the similarity value is the same or greater than the threshold value, the processor 140 may identify that the area which is the same as or similar to the area in which the first AR object 20-2 is displayed in the second image 20 exists in the first image 10.

For example, referring to FIG. 3A, the first AR object 20-2 displayed on an external apparatus may be displayed on a flat area of a real object (e.g., a round table). The processor 140 may calculate the similarity value between the information on the flat area in which the first AR object 20-2 received from an external apparatus is disposed (or space information of a round table) and the information on the object included in the first image 10. Referring to FIG. 3B, if the similarity value between the information on a flat area on the real object (e.g., a square table) included in the first image 10 and the information on the flat area received from an external apparatus is the same as or greater than a threshold value, the processor 140 may identify the flat area of the real object included in the first image 10 as the area in which the second AR object is to be displayed. The threshold value may vary according to the purpose of a manufacturer, setting of a user, the setting value received from an external server, etc.

However, this is merely an example and if the information 20-1 on the space included in the second image 20 is received from an external apparatus, the processor 140 may identify various objects included in the first image 10 based on a model on which machine learning is performed for obtaining characteristic information of an image, and determine the flat area of the identified object as the area in which the second AR object 10-2 is to be displayed.

As another example, the display apparatus 100 may receive the second image 20 from an external apparatus. The processor 140 according to an embodiment may analyze the received second image 20 and obtain the information 20-1 on the space included in the second image 20 and the location information of the first AR object 20-2 provided in the second image 20 in the space, needless to say. In this case, even if the information 20-1 on the space and location information are not received from the external apparatus, the processor 140 may identify the area in which the second AR object 10-2 is to be displayed based on the information obtained by itself.

The processor 140 according to an embodiment may obtain information on a space included in the first image and information on a space included in the second image using at least one of point cloud or semantic segmentation.

The processor 140 according to an embodiment may display the second AR object 10-2 on a specific location of the identified area based on the location information of the first AR object 20-2 in the space.

The location information of the first AR object 20-2 in the space according to an embodiment may include relative location information on the first AR object in a specific space included in the second image 10. The processor 140 may identify the location information corresponding to the relative location information of the first AR object 20-2 in a specific location included in the first image 10 and display the second AR object 10-2 on a specific location.

For example, if the first AR object 20-2 is displayed on a flat area of a real object (e.g., a round table), the location information on a space of the first AR object 20-2 may include coordinate information based on the corresponding flat area. The processor 140 may identify the location information for displaying the second AR object 20-2 based on the coordinate information in a specific space included in the first image 10.

As another example, the location information of the first AR object 20-2 in the space may include the distance that the first AR object 20-2 is spaced apart from a specific border of the corresponding flat area.

As another example, the location information of the first AR object 20-2 in the space may refer to the ratio of the area occupied by the first AR object 20-2 compared to an entire area of the corresponding flat area. However, the above embodiment is merely an example and the location information may include various types of information which may define a specific location in a space.

Figure 4:
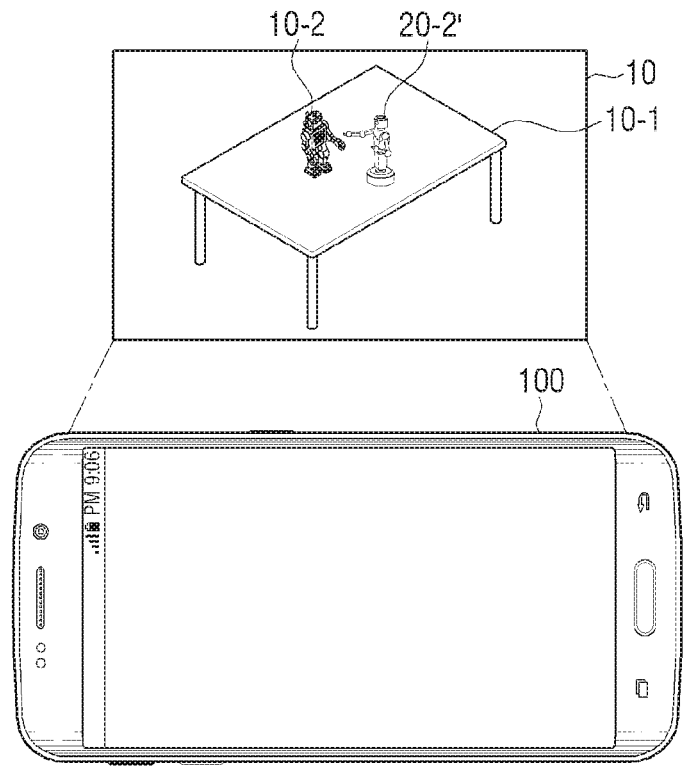
FIG. 4 is a view illustrating a method for displaying an AR object in different display apparatuses according to an embodiment.
Figure 4:
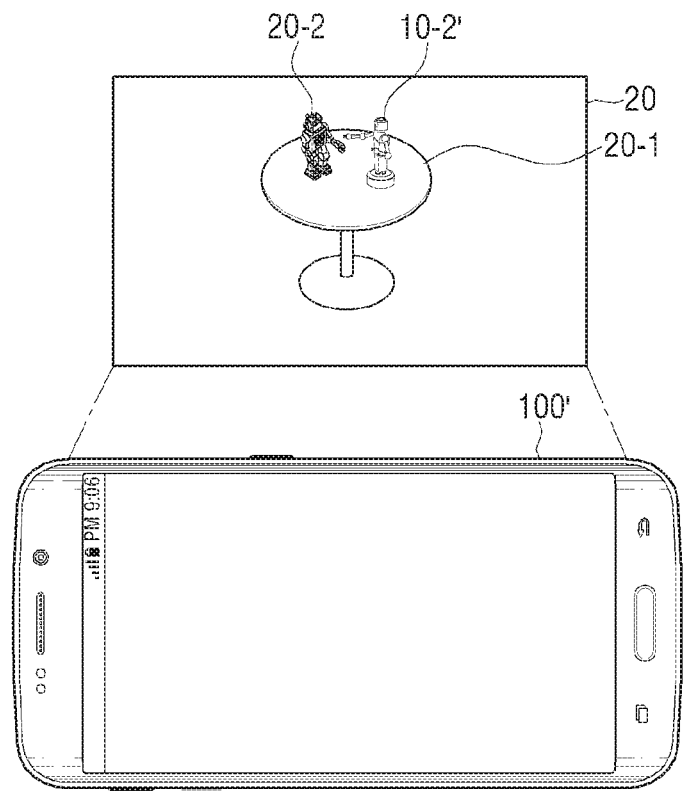

FIG. 4 is a view illustrating a method for displaying an AR object in different display apparatuses according to an embodiment.

Referring to FIG. 4, the display apparatus 100 may output the first image 10 by adding an AR object to the flat area (or flat space) of the real object (e.g., a square table). Here, the AR object may include the second AR object 10-2 added to the first image 10 based on the information received from an external apparatus and the first AR object 20-2' added directly by the display apparatus 100 to the first image 10 by itself.

The display apparatus 10 may transmit the information 10-1 on a space included in the first image 10 and the location information of the first AR object 20-2' in the space to the external apparatus 100'.

According to an embodiment, the second AR object 20-2' added to the first image 10 by the display apparatus 100 may refer to an object that moves according to the user command regarding the display apparatus 100 and the first AR object 10-2 added to the first image 10 based on the information received from the external apparatus 100' may refer to the object that moves according to the user command regarding the external apparatus 100'.

As illustrated in FIG. 4, the information 20-1 on the space included in the second image 20 provided in the external apparatus 100' may be different from the information 10-1 on the space included in the first image 10. For example, the information 20-1 may be different from the information 10-1 as a flat surface corresponding to a round table and a flat surface corresponding to a square table. In this case, the processor 140 may identify the location information corresponding to relative location information of the first AR object 10-2 for displaying the first AR object 10-2 corresponding to the external apparatus 100' in the flat surface of the object (e.g., a square table) included in the first image 10. In addition, the processor 140 may add the first AR object 10-2 to the first image 10 according to the identified location information.

The external apparatus 100' may output the second image 20 by adding an AR object to the flat area (or a flat space) of the real object (e.g., a round table). Here, the AR object may include the second AR object 10-2' added to the second image 20 based on the information received from the display apparatus 100 and the first AR object 20-2 added directly by the external apparatus 100' to the second image 20.

Returning back to FIG. 1, if another object is located at the location of the identified location information, the processor 140 may re-identify the location information of the second AR object 10-2 in a specific space included in the first image 10 based on the information 10-1 regarding the space included in the first image 10. The detailed description thereof will be made with reference to FIG. 5A and FIG. 5B.

Figure 5A:
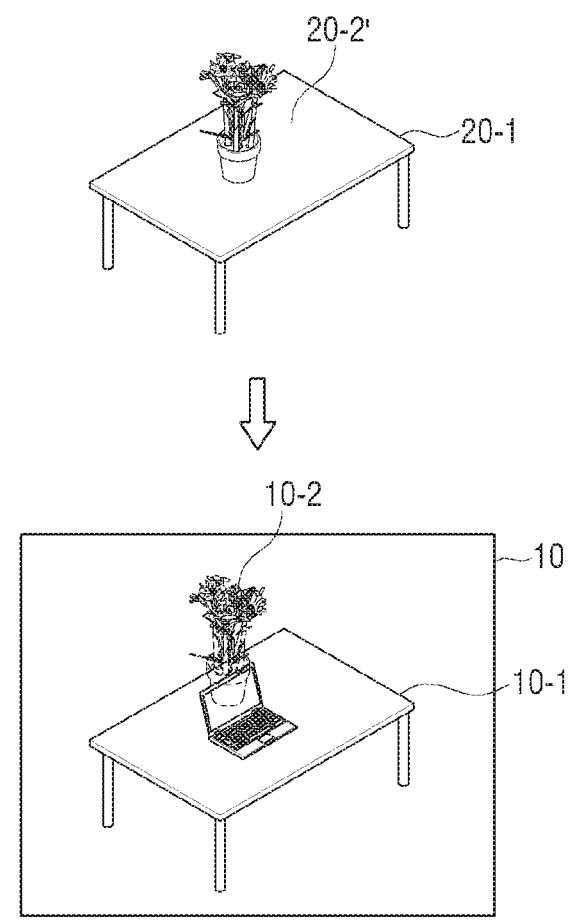
FIG. 5A and FIG. 5B are views illustrating a method for displaying an AR object according to another embodiment.
Figure 5B:
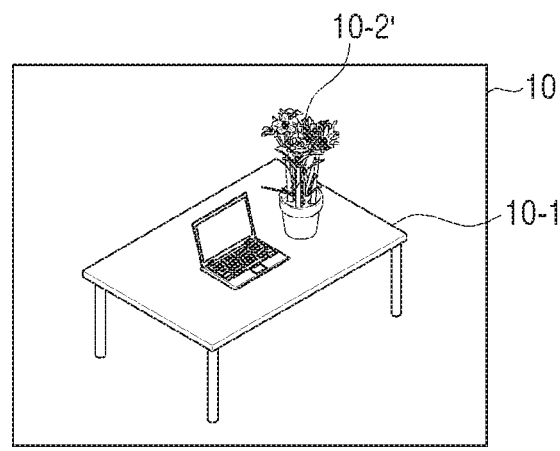

FIGS. 5A and 5B are views illustrating a method for displaying an AR object according to another embodiment.

If the information 20-1 on a space included in the second image 20 received from the external apparatus 100' and the location information of the first AR object 20-2 provided to the second image 20 in the space are received, the processor 140 may identify the area in which the second AR object 10-2 is to be displayed based on the information received from the external apparatus 100' and the information 10-1 on the space included in the first image 10.

Referring to FIG. 5A, it may be assumed that the first AR object 20-1 is displayed at a relative center location in a specific space of the second image 20. Here, the center location is merely an example set for convenience of description and the location is not limited thereto.

The processor 140 according to an embodiment may identify the location information corresponding to the relative location (e.g., a center location) of the first AR object 20-1 in a specific space included in the first image 10 and add the second AR object 10-1 corresponding to the first AR object 20-1 according to the location information identified in the first image 10.

As illustrated in FIG. 5A, the case in which another object (e.g., a real object) is located in the location of the identified location information may be assumed.

The processor 140 according to an embodiment may re-identify the location information of the second AR object 10-2 in a specific space included in the first image 10 based on the location information 10-1 regarding the space included in the first image 10.

Referring to FIG. 5B, the space in which an object does not exist in a specific space (e.g., a square table) of the first image 10 is re-identified and the location information corresponding to the relative location information of the first AR object 20-2 in the re-identified space may be re-identified. In addition, the processor 140 may display the second AR object 10-2' based on the re-identified location information.

For another embodiment, the processor 140 may identify the space in which an object does not exist in a specific space, and identify the location information in which the second AR object 10-2' is to be displayed in the identified space.

Returning back to FIG. 1, if object identification information and additional information corresponding to the object identification information are received, the processor 140 according to an embodiment may identify the object corresponding to the object identification information in the first image, and control the display to display an AR object corresponding to the additional information on the area where the identified object is displayed.

Figure 6:
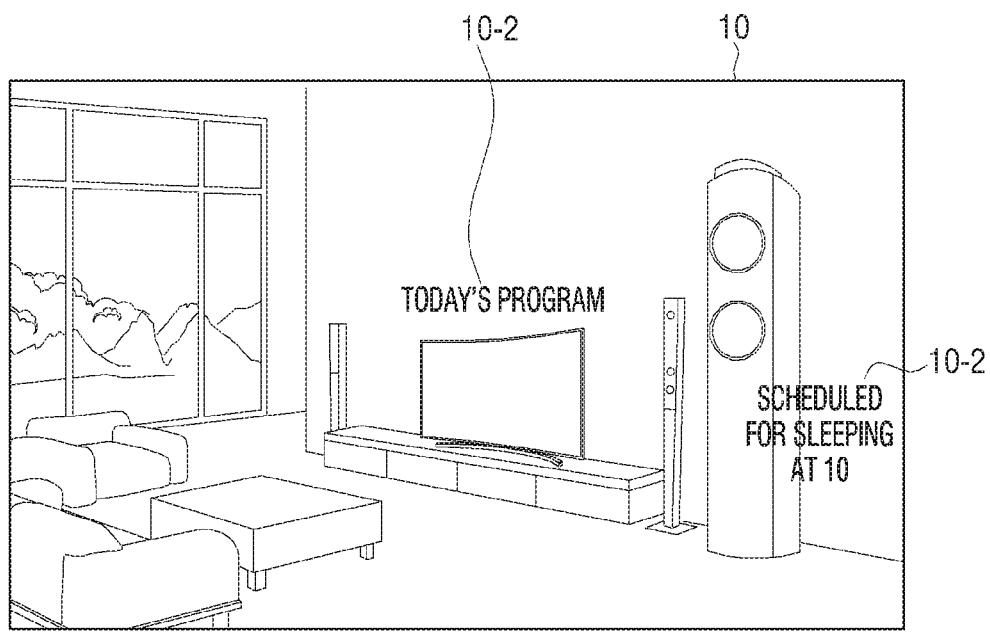
FIG. 6 is a view illustrating a method for displaying an AR object according to another embodiment.

FIG. 6 is a view illustrating a method for displaying an AR object according to another embodiment.

If the identification information of an object and additional information corresponding thereto are received through the communication interface 120, the processor 140 according to an embodiment may identify the object corresponding to the identification information in the first image 10. Here, the identification information may refer to the type, attribute, etc. of the object. For example, referring to FIG. 6, it may be assumed that 'TV' and 'air conditioner' are received as the identification information. The processor 140 may identify the 'TV' and 'air conditioner' in the first image 10.

The processor 140 according to an embodiment may display the AR object corresponding to the additional information on the area where the identified object is displayed. Referring to FIG. 6, if 'today's program' which is the additional information corresponding to a TV is received, 'today's program' may be displayed in a peripheral area (or an adjacent area) of the TV object identified as the AR object 10-2. Here, the peripheral area may refer to a predetermined area such as an area spaced apart for a predetermined distance, a flat area, a left or right area, etc. However, this is merely an example and the AR object 10-2 may be displayed at an arbitrary area near the identified object. As another example, if 'scheduled for sleeping at 10' which is additional information corresponding to an air conditioner is received, 'scheduled for sleeping at 10' may be displayed at a peripheral area (or adjacent area) of the air conditioner object identified as the AR object 10-2.

Returning back to FIG. 1, the processor 140 may identify a spatial characteristic of the area where the identified object is displayed, and display the AR object corresponding to the spatial characteristic. The detailed description thereof will be made below with reference to FIG. 7.

Figure 7:
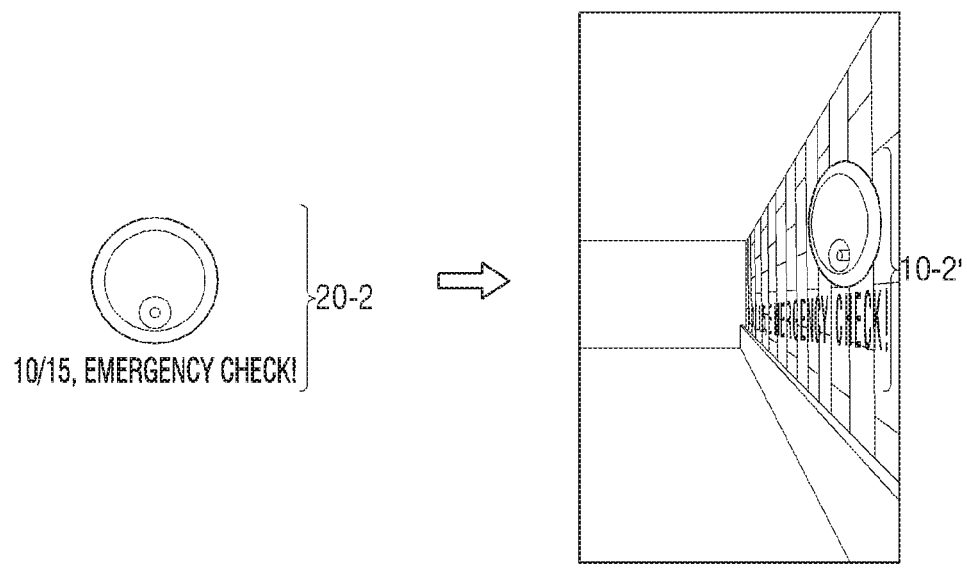
FIG. 7 is a view illustrating a spatial characteristic according to an embodiment.

FIG. 7 is a view illustrating a spatial characteristic according to an embodiment.

Referring to FIG. 7, if the first AR object 20-2 is received, the processor 140 may obtain the area in which the second AR object 10-2 corresponding to the received first AR object 20-2 is to be displayed and the location information thereof. In addition, the processor 140 may identify the spatial characteristic of the corresponding area. Here, the spatial characteristic may refer to the object which defines the size of a space such as a floor, a wall, etc. and the characteristic of the corresponding object obtained based on the distance between the camera 130, direction of the view of the camera, the degree of slope of the camera 130 (or the display apparatus 100).

The processor 140 according to an embodiment may add the first AR object 20-2 directly to the first image 10 and as another example, change the first AR object 20-2 to correspond to the identified spatial characteristic and obtain and add the second AR object 10-2. For example, as illustrated in FIG. 7, the second AR object 10-2 may be the AR object obtained by applying perspective based on the distance between the identified space (or area) and the camera 130.

Figure 2:
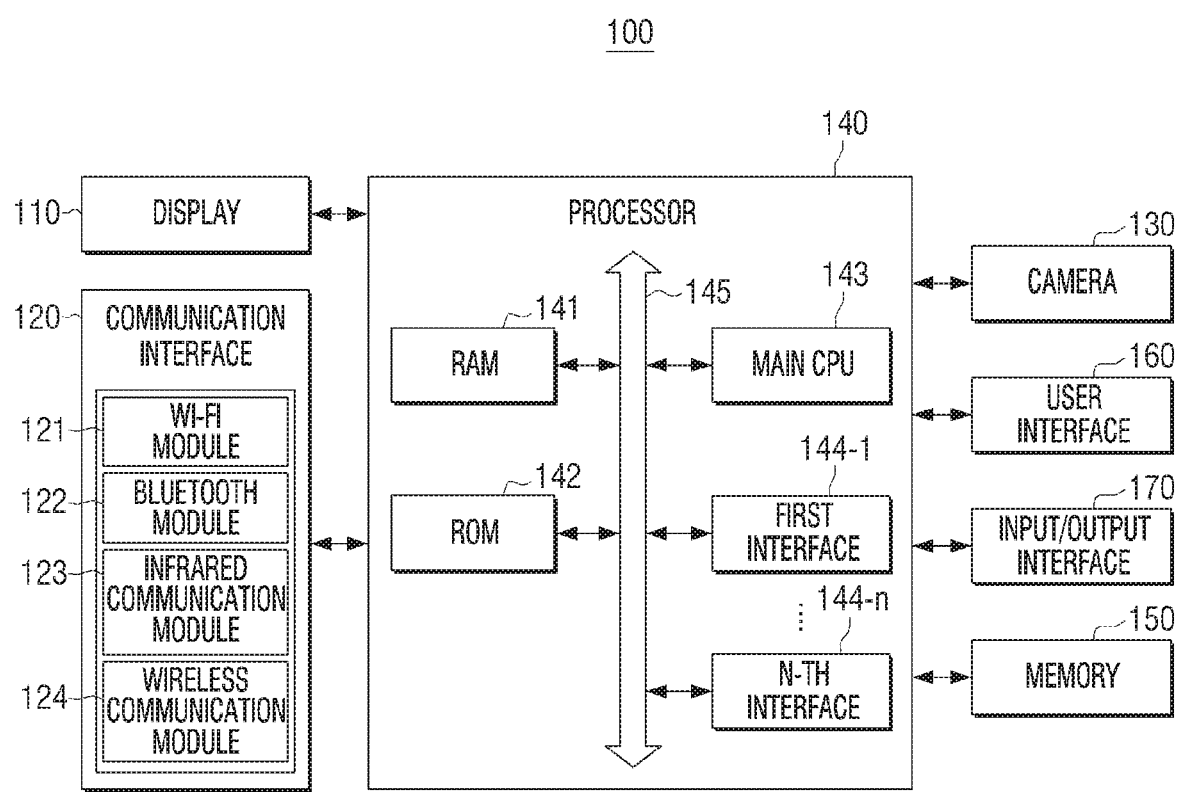
FIG. 2 is a block diagram illustrating a detailed configuration of a display apparatus illustrated in FIG. 1.

FIG. 2 is a block diagram illustrating a detailed configuration of a display apparatus illustrated in FIG. 1.

Referring to FIG. 2, the display apparatus 100 according to an embodiment may include the display 110, the communication interface 120, the camera 130, the processor 140, the memory 150, the user interface 160 and the input and output interface 170. In FIG. 2, the configurations overlapping with the configurations shown in FIG. 1 will not be described in detail.

The communication interface 120 is provided to perform communication with various types of external apparatuses according to various types of communication methods. The communication interface 120 may include a Wi-Fi module 121, a Bluetooth module 122, an infrared communication module 123, a wireless communication module 124, etc. Here, each communication module may be implemented as at least one hardware chip formation.

The processor 140 may perform communication with various external apparatuses by using the communication interface 120. Here, the external apparatus may include a display apparatus such as a TV, an image processing apparatus such as a set-top box, an external server, a controller such as a remote controller, a sound output apparatus such as a Bluetooth speaker, a lighting apparatus, a home appliance such as a smart cleaner and a smart refrigerator, a server such as an IoT home manager, etc.

The Wi-Fi module 121 and the Bluetooth module 122 may perform communication using a Wi-Fi method and a Bluetooth method, respectively. In the case of using the Wi-Fi module 121 or the Bluetooth module 122, connection information such as a service set identifier (SSID) and a session key may be received and transmitted first, and communication may be connected using the connection information, and then, various information may be received and transmitted.

The infrared communication module 123 performs communication according to the Infrared Data Association (IrDA) technology that transmits data in a wireless method to a near area by using infrared between visible ray and millimeter wave.

The wireless communication module 124 may include at least one communication chip that performs communication according to various wireless communication standards such as ZigBee, 3rd generation (3G), 3rd generation partnership project (3GPP), and long term evolution (LTE), LTE advanced (LTE-A), 4th Generation (4G), 5th Generation (5G), etc.

In addition, the communication interface 120 may include at least one of wired communication modules that perform communication using a Local Area Network (LAN) module, an Ethernet module, a pair cable, a coaxial cable or an optical fiber cable.

According to an example, the communication interface 120 may use the same communication module (e.g., Wi-Fi module) for communicating with an external apparatus such as a remote controller and an external server.

According to another example, the communication interface 120 may use different communication modules (e.g., Wi-Fi module) for communicating with an external apparatus such as a remote controller and an external server. For example, the communication interface 120 may use at least one of an Ethernet module or a Wi-Fi module for communicating with an external server, and use a BT module for communicating with an external apparatus such as a remote controller. However, this is merely an example, and the communication interface 120 may use at least one of various communication modules when communicating with a plurality of external apparatuses or external servers.

The memory 150 may be implemented as an interior memory such as a read only memory (ROM) (e.g., electrically erasable programmable ROM (EEPROM)) or a random access memory (RAM) included in the processor 140, or implemented as a memory separated from the processor 140. In this case, the memory 150 may be implemented as a form of a memory embedded in the display apparatus 100 or in a form of a memory which may be attached to or detached from the display apparatus 100 according to a data storing usage. For example, the data for driving the display apparatus 100 may be stored in the memory embedded in the display apparatus 100, and the data for enlarging the display apparatus 100 may be stored in the memory attached to or detached from the display apparatus 100. The memory embedded in the display apparatus 100 may be implemented as at least one of a volatile memory (e.g., dynamic RAM (DRAM), static RAM (SRAM), or synchronous dynamic RAM (SDRAM), etc.) and a nonvolatile memory (e.g., one time programmable read only memory (OTPROM), programmable ROM (PROM), erasable and programmable ROM (EPROM), electrically erasable and programmable ROM (EEPROM), mask ROM, flash ROM, flash memory (e.g., NAND flash or NOR flash), hard drive, or solid state drive (SSD)), and the memory which may be attached to or detached from the display apparatus 100 may be implemented as a form of a memory card (e.g., a compact flash (CF), a secure digital (SD), micro-SD, mini-SD, an extreme digital (XD), a multi-media card (MMC) and the like) and an external memory (e.g., USB memory) which may be connected to a USB port and the like.

The processor 140 may be configured to control an overall operation of the display apparatus 100 using various programs stored in the memory 150.

In detail, the processor 140 includes a RAM 141, a ROM 142, a main central processing unit (CPU) 143, first through nth interfaces 144-1 to 144-$n$, and a bus 145.

The RAM 141, the ROM 142, the main CPU 143, the first through nth interfaces 144-1 to 144-$n$, etc. may be connected to one another through the bus 145.

The ROM 142 stores a set of instructions for system booting. If a turn-on command is input and the power is supplied, the main CPU 143 copies the O/S stored in the memory 150 to the RAM 141 according to the command stored in the ROM 142, and boots the system by executing the O/S. When the booting is completed, the main CPU 143 may copy the various application programs stored in the memory 150 to the RAM 141, and perform various operations by executing the application programs copied to the RAM 141.

The main CPU 143 accesses the memory 150 to perform booting using the O/S stored in the memory 150. The main CPU 143 may perform various operations by using various programs, contents data, and the like stored in the memory 150.

The first to n—the interface 144-1 to 144-$n$ are connected to the above described various configurations. One of the interfaces may be network interface which is connected to an external apparatus via a network.

The processor 140 may perform a graphics processing function (video processing function). For example, the processor 140 may generate a screen including various objects such as an icon, an image, a text, etc. using a calculator (not shown) and a renderer (not shown). Here, the calculator may calculate coordinate values at which each object will be displayed and attribute values such as forms, sizes, and colors according to the layout of the screen, based on the received control command. The renderer may generate screens of various layouts including an object based on the attribute value which is calculated by the calculator. In addition, the processor 140 may perform various image-processing regarding the video data, such as decoding, scaling, noise-filtering, frame rate converting, resolution conversion, and so on.

The processor 140 may perform processing of audio data. Specifically, the processor 140 may perform various processings, such as decoding, amplification, and noise filtering of the audio data.

A user interface 160 may be implemented to be a button, a touch pad, a mouse and a keyboard, or may be implemented to be a touch screen that can perform a display function together with an operation input function described above. Here, the button may be various types of buttons, such as a mechanical button, a touch pad, a wheel, etc., which are formed at the arbitrary area such as a front, side, or rear of the exterior of a main body of the display apparatus 100.

The display apparatus 100 according to an embodiment may include an input/output interface 170. The input/output interface 170 may be one interface among a high definition multimedia interface (HDMI), a mobile high-definition link (MHL), a universal serial bus (USB), a display port (DP), Thunderbolt, video graphics array (VGA) port, an RGB port, D-subminiature (D-SUB) or digital visual interface (DVI).

The input/output interface 170 may input or output at least one of an audio signal or a video signal.

According to an embodiment, the input/output interface 170 may include a port which inputs and outputs only an audio signal and a port which inputs and outputs only a video signal as an additional port, or may be implemented as one port that inputs or outputs both of an audio signal and a video signal.

The display apparatus 100 may be implemented as an apparatus which does not include a display and transmit an image signal to an additional display apparatus.

The display apparatus 100 may receive a user voice signal from an external apparatus including a microphone. In this case, the received user voice signal may be a digital voice signal but according to an embodiment, may be an analog voice signal. For an example, the display apparatus 100 may receive the user voice signal through a wireless communication method such as Bluetooth or Wi-Fi. Here, the external apparatus may be implemented as a remote controller or a smart phone.

For a voice recognition of the voice signal received from an external apparatus, the display apparatus 100 may transmit the corresponding voice signal to an external server.

In this case, the communication module for communicating with an external apparatus and an external server may be implemented in one module or implemented additionally. For example, the display apparatus 100 may communicate with the external apparatus by using a Bluetooth module, and may communicate with the external server by using an Ethernet modem or a Wi-Fi module.

The display apparatus 100 may additionally include a tuner and a demodulator according to an embodiment.

The tuner may receive a radio frequency (RF) broadcasting signal by tuning the channel selected by a user among the RF broadcasting signals received through an antenna or by tuning all pre-stored channels.

The demodulator may receive and demodulate a digital IF signal (DIF) converted in the tuner and perform channel decryption, etc.

The speaker may be an element that outputs various informing sound or voice messages in addition to various audio data processed in an input/output interface.

The display apparatus 100 may further include a microphone. The microphone is a configuration for receiving a voice of the user or other sounds and converting the received sound into the audio data.

The microphone may receive a user's voice in an activation state. For example, the microphone may be formed as an all-in-one type by being integrated at an upper side, a front direction, and a side direction of the display apparatus 100. The microphone may include various configurations such as a microphone which collects a user voice in analog form, an amplification circuit which amplifies the collected user voice, and an analog-to-digital (A/D) converting circuit which performs sampling on the amplified user voice and convert the voice to a digital signal, and a filter circuit which removes a noise element from the converted digital signal.

FIG. 8 is a flow chart illustrating a method for controlling a display apparatus according to an embodiment.

According to an embodiment, the method for controlling a display apparatus includes displaying the first image captured in real time through a camera in operation S810.

In addition, the method includes receiving the information on the space included in the second image captured in an external apparatus in real time and the location information of the first AR object provided to the second image in the space, in operation S820.

In addition, the method includes adding the second AR object corresponding to the first AR object to the first image and display the second AR object based on information on a space included in the first image, information on a space included in the second image, and location information of the first AR object in the space in operation S830.

Here, the operation S830 in which the second AR object is displayed may include identifying an area where the second AR object is to be displayed based on information on a space included in the first image and information on a space included in the second image, displaying the second AR object on a specific location of the identified area based on location information of the first AR object in the space, and adding the obtained object image to a corresponding image section and displaying the object image, based on the location information.

The location information of the first AR object in the space according to an embodiment may include relative location information of the first AR object in a specific space included in the second image, and the operation S830 in which the second AR object is displayed includes identifying location information corresponding to the relative location information of the first AR object in a specific space included in the first image and displaying the second AR object in a specific location.

Here, the operation S830 in which the second AR object is displayed includes, if another object is located at the location of the identified location information, re-identifying the location information of the second AR object in a specific space included in the first image based on the information on the space included in the first image.

The information on the space included in the first image and the information on the space included in the second image according to an embodiment may include at least one of color information, material information, type information or size information regarding the object included in each space.

The operation S830 in which the second AR object is displayed may include identifying an area where the second AR object is to be displayed based on the similarity value regarding at least one of color information, material information, type information or size information regarding the object included in each space.

The receiving in operation S820 according to an embodiment may include receiving object identification information and additional information corresponding to the object identification information, and the operation S830 in which the second AR object is displayed may include identifying the object corresponding to the object identification information in the first image and displaying the AR object corresponding to the additional information on the area in which the identified object is displayed.

Here, the displaying an AR object corresponding to the additional information may include identifying a spatial characteristic of an area where the identified object is displayed and displaying an AR object corresponding to the spatial characteristic.

The operation S830 in which the second AR object is displayed may include obtaining information on a space included in the first image and information on a space included in the second image using at least one of point cloud or semantic segmentation.

A method for controlling a display apparatus according to another embodiment may include displaying an image captured in real time through the camera, obtaining information on a space included in the image and location information of an AR object in the space provided to the image, and transmitting the obtained information to an external apparatus, and the location information of an AR object in the space may include relative location information of the AR object in a specific space included in the image.

The methods according to the above-described various embodiments may be realized in a form of application that may be installed in the existing electronic apparatus.

Further, the methods according to the above-described various embodiments may be realized by upgrading the software or hardware of the existing electronic apparatus.

The above-described various embodiments may be executed through an embedded server in the electronic apparatus or through at least one external server between an electronic apparatus and a display apparatus.

The above-described various embodiments may be realized as software including an instruction which may be stored in a machine-readable storage media which may be read by a machine (e.g., a computer). The machine is an apparatus that calls the instructions stored in the storage media and which may operate according to the called instructions, and may include the electronic apparatus in the embodiments (e.g., an electronic apparatus (A)). If the instruction is executed by a processor, the processor may perform the function corresponding to the instructions by itself or by using the other elements under control of the processor. The instruction may include code generated or executed by a compiler or an interpreter. A machine-readable storage medium may be provided in the form of a non-transitory storage medium. Herein, the term "non-transitory" only denotes that a storage medium does not include a signal but is tangible, and does not distinguish the case where a data is semi-permanently stored in a storage medium from the case where a data is temporarily stored in a storage medium.

According to an embodiment, the method according to the above-described various embodiments may be provided as being included in a computer program product. The computer program product may be traded as a product between a seller and a consumer. The computer program product may be distributed online in the form of machine-readable storage media (e.g., compact disc ROM (CD-ROM)) or through an application store (e.g., Play Store™ and App Store™). In the case of online distribution, at least a portion of the computer program product may be at least temporarily stored or temporarily generated in a server of the manufacturer, a server of the application store, or a storage medium such as a memory of a relay server.

According to the various embodiments, the respective elements (e.g., module or program) of the elements mentioned above may include a single entity or a plurality of entities. According to the various embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to a variety of embodiments may be executed consecutively, in parallel, repeatedly, or heuristically, or at least some operations may be executed according to a different order, may be omitted, or the other operation may be added thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display apparatus comprising:
   a display;
   a communication interface;
   a first camera; and
   a processor configured to:
   obtain, through the first camera, a first image including a second space in real time;
   obtain, from an external apparatus through the communication interface, first space information about a first real object disposed in a first space included in a second image and location information of a first augmented reality (AR) object provided in the first space included in the second image, wherein the second image obtained through a second camera is included in the external apparatus;
   identify an area where a second AR object to be displayed based on second space information about a second real object disposed in the second space included in the first image and the first space information;
   identify a location of the identified area based on the location information of the first AR object provided in the first space; and
   control the display to display the second AR object at the identified location of the identified area by changing a shape of the first AR object to correspond to the identified location of the identified area.

2. The display apparatus as claimed in claim 1, wherein the location information of the first AR object provided in the first space includes relative location information of the first AR object provided in a first specific space included in the second image, and
   wherein the processor is further configured to identify location information corresponding to the relative location information of the first AR object provided in the first specific space included in the first image and control the display to display the second AR object at a specific location.

3. The display apparatus as claimed in claim 2, wherein the processor is further configured to, based on another object being located at the location of the identified location information, re-identify location information of the second AR object provided in a second specific space included in the first image based on the second space information.

4. The display apparatus as claimed in claim 1, wherein the second space information and the first space information includes at least one of color information, material information, type information or size information regarding an object included in each of the first space and the second space, and
   wherein the processor is further configured to identify an area where the second AR object is to be displayed based on a similarity value regarding the at least one of the color information, the material information, the type information or the size information of the object included in each of the first space and the second space.

5. The display apparatus as claimed in claim 1, wherein the processor is further configured to, based on object identification information and additional information corresponding to the object identification information being received, identify an object corresponding to the object identification information in the first image, and control the display to display a third AR object corresponding to the additional information at an area where the identified object is displayed.

6. The display apparatus as claimed in claim 5, wherein the processor is further configured to identify a spatial characteristic of the area where the identified object is displayed and control the display to display the third AR object corresponding to the spatial characteristic.

7. The display apparatus as claimed in claim 1, wherein the processor is further configured to obtain the second space information and the first space information using at least one of a point cloud or a semantic segmentation.

8. A display apparatus comprising:
a display;
a communication interface;
a camera; and
a processor configured to:
   control the display to display an image captured in real time by the camera;
   obtain space information about a real object disposed in a space included in the image and location information of an AR object provided in the space of the image;
   control the communication interface to transmit the space information and the location information to an external apparatus;
   identify an area where the AR object to be displayed based on the space information; and
   control the display to display the AR object at a location of the identified area based on the location information of the AR object.

9. A method for controlling a display apparatus, the method comprising:
   obtaining, through a first camera, a first image including a second space in real time;
   obtaining, from an external apparatus, first space information about a first real object disposed in a first space included in a second image and location information of a first AR object provided in the first space included in the second image, wherein the second image obtained through a second camera included in the external apparatus;
   identify an area where a second AR object to be displayed based on second space information about a second real object disposed in the second space included in the first image and the first space information;
   identify a location of the identified area based on the location information of the first AR object provided in the first space; and
   displaying the second AR object at the identified location of the identified area by changing a shape of the first AR object to correspond to the identified location of the identified area.

10. The method as claimed in claim 9, wherein the displaying the second AR object comprises:
   adding an obtained object image to a corresponding image section of the first image and displaying the obtained object image, based on the location information of the first AR object provided in the first space.

11. The method as claimed in claim 10, wherein the location information of the first AR object provided in the first space includes relative location information of the first AR object provided in a first specific space included in the second image, and
   wherein the displaying the second AR object comprises identifying location information corresponding to the relative location information on the first AR object provided in the first specific space included in the first image and displaying the second AR object at a specific location.

12. The method as claimed in claim 11, wherein the displaying the second AR object comprises, based on another object being located at the location of the identified location information, re-identifying location information of the second AR object provided in a second specific space included in the first image based on the second space information.

13. The method as claimed in claim 9, wherein the second space information and the first space information includes at least one of color information, material information, type information or size information regarding an object included in each of the first space and the second space, and
   wherein the displaying the second AR object comprises identifying an area where the second AR object is to be displayed based on a similarity value regarding the at least one of the color information, the material information, the type information or the size information regarding the object included in each of the first space and the second space.

14. The method as claimed in claim 9, wherein the receiving comprises receiving object identification information and additional information corresponding to object identification information, and
   wherein the displaying the second AR object comprises:
   identifying an object corresponding to the object identification information in the first image, and
   displaying a third AR object corresponding to the additional information at an area where the identified object is displayed.

15. The method as claimed in claim 14, wherein the displaying the third AR object corresponding to the additional information comprises identifying a spatial characteristic of the area where the identified object is displayed and displaying the third AR object corresponding to the spatial characteristic.

16. The method as claimed in claim 9, wherein the displaying the second AR object comprises obtaining the second space information and the first space information using at least one of a point cloud or a semantic segmentation.

* * * * *